United States Patent [19]
Binsbergen et al.

[11] Patent Number: 5,229,472
[45] Date of Patent: Jul. 20, 1993

[54] ANIONIC EXTRUDER POLYMERIZATION PROCESS

[75] Inventors: Frederik L. Binsbergen, Amsterdam, Netherlands; Ulrich Berghaus, Aachen, Fed. Rep. of Germany; Willem Sjardijn, Amsterdam, Netherlands

[73] Assignee: Shell Oil Company, Houston, Tex.

[21] Appl. No.: 897,140

[22] Filed: Jun. 11, 1992

[30] Foreign Application Priority Data

Jul. 4, 1991 [EP] European Pat. Off. ........ 91111093.0

[51] Int. Cl.$^5$ ..................... C08F 2/02; C08F 236/04; C08F 236/08
[52] U.S. Cl. ........................................ 526/64; 526/88; 526/173; 526/920; 525/52; 525/250; 525/314
[58] Field of Search ............... 526/64, 88, 173, 920; 525/52, 250, 53

[56] References Cited

U.S. PATENT DOCUMENTS

3,703,567 11/1972 Sutter et al. .
3,780,139 12/1973 Sutter et al. .
4,965,327 10/1990 Stachowiak et al. ........... 526/173 X Primary Examiner—Fred Teskin

[57] ABSTRACT

An improved process for the anionic extruder polymerization of ethylenically unsaturated compounds in the presence of an organoalkali metal compound initiator employs relatively high reaction temperatures but relatively short residence times in the extruder.

8 Claims, No Drawings

ANIONIC EXTRUDER POLYMERIZATION PROCESS

FIELD OF THE INVENTION

This invention relates to an improved anionic polymerization process. More particularly, the invention relates to a process of polymerizing ethylenically unsaturated compounds with an anionic initiator in an extruder.

BACKGROUND OF THE INVENTION

The anionic extruder polymerization of styrene and other ethylenically unsaturated monomers, particularly 1,3-alkadienes, with an alkyl- or aryllithium initiator is known in the art. In U.S. Pat. No. 3,703,567 a continuous, solvent-free extruder process is disclosed for the production of segment copolymers. A prepolymer of a vinyl aromatic compound and a 1,3-alkadiene is produced in the presence of a catalytic amount of a lithium initiator is fed to an extruder with additional vinyl aromatic compound and 1,3-alkadiene. The temperature of the polymerization in the extruder is kept below 100° C. by the use of a cooling medium circulating through the extruder jacket. In order to stabilize the resulting polymer, a terminating agent and a stabilizer is added during passage through the last quarter of the extruder. In U.S. Pat. No. 3,780,139 a similar process is disclosed wherein vinyl aromatic compound and 1,3-alkadiene are introduced to the extruder with the lithium initiator and during polymerization the temperature is maintained in the range from 50° C. to 150° C. by cooling. The product is a random copolymer.

In extruder polymerizations of these types, the regulation of the polymerization temperature is important because at unduly high temperatures a series of complex reactions takes place which includes thermal termination of polymer growth. This reaction, termed "thermal die-out", may be caused by elimination reactions which produce unsaturated compounds. See Kern et al, J. Appl. polymer Sci., 16, 3123-31 (1972). In general, the rate of termination increases sharply with temperature so that anionic polymerization is difficult if at all feasible at temperatures of 200° C. or above. Polymerization temperatures above 200° C. generally result in adverse effects on the polymer molecular weight and molecular weight distribution.

Most commercial extruders have large shaft diameters to increase throughput of the extruder. Such extruders have limited cooling capacity and temperatures above 200° C. are often observed. Anionic polymerization in such extruders does not provide acceptable product unless extensive and costly cooling is provided.

One solution to this problem is to produce a prepolymer outside the reactor and then introduce the prepolymer with additional monomer feed to the extruder. See U.K. patent No. 1,302,069. By this two-step process it is possible to conduct anionic polymerization in the extruder without undue thermal die-out if polymerization temperatures above about 200° C. are reached. It would be of advantage, however, to provide an improved one-step extruder polymerization process to anionically polymerize ethylenically unsaturated monomers to polymer products of desirable molecular weight and molecular weight distribution.

SUMMARY OF THE INVENTION

The present invention provides an improved process for the anionic polymerization of ethylenically unsaturated monomers in an extruder. More particularly, the invention provides an improved process for the anionic polymerization of ethylenically unsaturated monomers which utilizes high temperatures but short extruder residence times. The process of the invention produces good yields of polymer of high molecular weight and narrow molecular weight distribution.

DESCRIPTION OF THE INVENTION

The process of the invention comprises the anionic polymerization of ethylenically unsaturated monomers in the presence of an alkali metal-containing initiator. The process takes place during passage through an extruder at elevated reaction temperatures and with short extruder residence times.

The process of the invention is applied to the polymerization of a variety of ethylenically unsaturated compounds including unsaturated esters, e.g., methyl methacrylate, ethyl acrylate and vinyl acetate, unsaturated ketones such as methyl vinyl ketone and butyl vinyl ketone, nitroethylenes and vinylidine cyanides such as acrylonitrile and methacrylonitrite. The preferred ethylenically unsaturated monomers are ethylenically unsaturated hydrocarbons such as vinyl aromatic hydrocarbons and 1,3-alkadienes.

Suitable vinyl aromatic hydrocarbons have up to 12 carbon atoms inclusive and are illustrated by styrene, 4-methylstyrene, 3-propylstyrene, vinylnaphthalene, 3,5-diethylstyrene and α,4-dimethylstyrene. Of the vinyl aromatic hydrocarbons, styrene is especially preferred. The 1,3-alkadienes have up to 8 carbon atoms inclusive and are illustrated by 1,3-butadiene (butadiene), 2-methyl-1,3-butadiene (isoprene), 1,3-pentadiene, 2,3-dimethyl-1,3-butadiene and 1,3-ortadiene. Of the 1,3-alkadienes, butadiene and isoprene are particularly preferred.

The initiator to be employed is an organoalkali metal compound and preferably is an organolithium compound. Such lithium compounds are represented by the formulas RLi or ROLi where R independently is a hydrocarbon group which suitably is aliphatic, including cycloaliphatic, or aromatic of up to 20 carbon atoms inclusive. Particularly preferred as initiator is an alkyllithium compound such as n-butyllithium, sec-butyllithium, n-decyllithium or eicosyllithium. As initiator, the compound sec-butyllithium is especially preferred.

The ratio of initiator to monomer in the polymerization feed will in part determine the molecular weight of the polymer product. The molar ratio of initiator to total monomer is suitably from about 1:500 to about 1:50,000 although higher ratios may be used if low molecular weight polymer is desired. In the embodiment where styrene or styrene/butadiene or isoprene polymers are produced, from about 0.2 g to about 1.0 g of the preferred sec-butyllithium initiator is used per kilogram of styrene. Preferably from about 0.5 g to about 0.8 g of sec-butyllithium is employed per kilogram of styrene.

The polymerization process is conducted by feeding to an extruder the monomer or monomers and the polymerization initiator. As employed herein, the term "extruder" means any of a number of conventional devices suitable for blending polymeric material having a feed inlet and a product outlet. The extruder may also include a hopper at the inlet, which is useful when the feed is in the form of pellets, and a die at the outlet to produce polymeric product of desired shape, e.g., pipe, film, sheeting or tubing. By convention, the size of an extruder is defined by the nominal inside diameter of the barrel. The length of the barrel is expressed in the length to diameter ratio (L/D) and is often 20/1, 24/1, 30/1 or 36/1. Also by convention, the feed inlet is at the rear of the extruder and the product outlet is at the front of the extruder.

During operation, monomer feed is introduced into the feed inlet. The initiator is provided downstream from the feed inlet to produce a reaction zone downstream from the point of initiator introduction. This reaction zone is typically about 20 cm downstream from the initiator inlet. In the modification of the process of the invention designed to produce homopolymers or random copolymers, all monomeric feed is preferably introduced at or near the feed inlet of the extruder. In the embodiment of the invention designed to produce block copolymers, one monomer is introduced at the extruder inlet and the second monomer is provided at a point downstream from the point of initiator injection and the initial reaction zone. In such an embodiment, the first monomer reacts with the initiator to produce an alkali metal-capped or "living polymer chain" which subsequently reacts with the second monomer in a second reaction zone during continued passage through the extruder.

During passage through the extruder, the reacting monomer will cause a temperature rise to give a reaction temperature from about 150° C. to about 300° C., preferably from about 200° C. to about 300° C. The reacting monomer will be passed through the extruder at a rate sufficient to provide a residence time in the reaction zone of less than about 5 minutes, preferably less than about 2 minutes and more preferably less than about 30 seconds. Without wishing to be bound by any particular theory, it appears likely that at the elevated temperatures encountered in the extruder, polymerization takes place rapidly and is virtually complete in a relatively short time. However, because of the short residence time of the monomer feed/polymer produced in the extruder, the overall process is substantially unaffected by the competing reactions such as thermal die-out or thermal degradation.

The initial polymer product is deeply colored, indicating the presence of an alkali metal-capped living polymer. In the case of the polymerization of styrene with an alkyllithium initiator, for example, the initial product is a deep red in color from the presence of polystyryllithium. Stable polymer product is obtained by treating the living polymer with an active hydrogen compound as is known in the art to terminate polymerization.

The nature of the extruder polymerization provides for such termination within the reactor as by introducing the active hydrogen compound to the extruder downstream from the last reaction zone. Moreover, other materials are also introduced to modify the properties of the final polymer product. Rather than terminating the living polymer chains, a coupling agent such as an aliphatic ester or a dihalosilane is introduced into the reactor to provide coupled product of a molecular weight higher than that initially produced. This type of coupling process is also broadly conventional and well known. Other materials including fillers, pigments, blowing agents, viscosifiers or extender oils are also introduced, if desired, into the polymer product by adding such materials with the monomer feed to the extruder or by adding the materials to the extruder at some point after polymerization has taken place.

The products of the process are homopolymers or copolymers of conventional utility. Illustrative homopolymers include polystyrene and polybutadiene while illustrative copolymers include random as well as block copolymers of styrene and butadiene. The polymer products are characterized by a desirably high molecular weight and a narrow molecular weight distribution.

The invention is further illustrated by the following Illustrative Embodiments which should not be regarded as limiting. In the Illustrative Embodiments a co-rotating, self-wiping twin screw extruder, model ZSK 30 manufactured by Werner & Pfleiderer, with an L/D ratio of 29/1 was used. The styrene and isoprene monomers were freed from inhibitor by percolation through a cooled, neutral alumina column. Any dissolved oxygen was removed by purging with nitrogen. In all Illustrative Embodiments, a 1 molar solution of sec-butyllithium in cyclohexane was used as initiator. The initiator was introduced downstream from the styrene and in the Illustrative Embodiments directed to block copolymer production, the isoprene was introduced downstream from the initiator. In the Tables which follow, $M_w$ refers to weight average molecular weight, $M_n$ refers to number average molecular weight and $M_v$ refers to viscosity average molecular weight.

Illustrative Embodiments I-VI

A series of polymerizations were conducted in which styrene was introduced to the extruder at the rate of 5 kg/hr. The ratio of sec-butyllithium to styrene was kept constant at 0.5 g/kg. The rotating speed of the extruder screw was varied and the resulting influence on polymer molecular weight was determined. The results are shown in Table I.

TABLE I

| Illustrative Embodiment | Screw Speed rpm | $M_w \times 10^{-3}$ | $M_n \times 10^{-3}$ | $M_v/M_n$ |
|---|---|---|---|---|
| I | 50 | 448 | 113 | 3.98 |
| II | 100 | 479 | 163 | 2.94 |
| III | 150 | 272 | 113 | 2.41 |
| IV | 200 | 270 | 119 | 2.26 |
| V | 250 | 197 | 120 | 1.64 |
| VI | 300 | 190 | 121 | 1.57 |

Illustrative Embodiments VII-XII

The procedure of Illustrative Embodiments I-VI was repeated except that the rate of styrene introduction was varied and the screw rotating speed was kept constant at 200 rpm. The results are shown in Table II.

TABLE II

| Illus. Embod. | Styrene Feed kg/hr | $M_w \times 10^{-3}$ | $M_n \times 10^{-3}$ | $M_w/M_n$ | $M_n \times 10^{-3}$ |
|---|---|---|---|---|---|
| VII | 3.46 | 358 | 167 | 2.14 | 245 |
| VIII | 3.62 | 242 | 131 | 1.84 | 185 |
| IX | 4.75 | 270 | 119 | 2.26 | 215 |
| X | 7.5 | — | — | — | 212 |
| XI | 8.5 | 480 | 242 | 1.98 | 336 |
| XII | 11.09 | — | — | — | 257 |

Illustrative Embodiments XIII-XVI

In this series of Illustrative Embodiments, block copolymers of styrene and isoprene were produced. The rate of styrene introduction was approximately 3.5 kg/hr and the ratio of sec-butyllithium to styrene was 0.7 g/kg. The screw rotating speed was 200 rpm. Varying amounts of isoprene were introduced into the extruder downstream of the initiator introduction where the isoprene contacted the living polystyryllithium. The influence of the polymerization variables on the molecular weight of the polymer are shown in Table III. The polymer was injection molded into plaques that were opaque. Also measured was the glass transition temperature, $T_g$.

TABLE III

| Illus. Embod. | Isoprene feed, kg/hr | Isoprene content, % wt | $M_n \times 10^{-3}$ | $T_g$, PI °C. | $T_g$, PS °C. |
|---|---|---|---|---|---|
| XIII | 3.72 | 3.9 | 84 | −75 | 114 |
| XIV | 3.30 | 6.8 | 84 | −76 | 112 |
| XV | 4.53 | 17.5 | 148 | −48 | 111 |
| XVI | 2.28 | 33.0 | 93 | −45 | 109 |

Illustrative Embodiments XVII and XVIII

In these Illustrative Embodiments, random copolymers of styrene and isoprene were produced. Mixtures of varying amounts of styrene and isoprene were introduced at the extruder inlet at the rate of approximately 2.7 kg/hr. The ratio of initiator to styrene was kept constant at 0.8 g/kg, and the screw rotation speed was 200 rpm. The influence of the polymerization variables on polymer properties is shown in Table IV. Injection molded plaques of the copolymers were transparent.

TABLE IV

| Illus Embod. | Monomer feed, kg/hr | Isoprene content, % wt | $M_n \times 10^{-3}$ | $T_g$, PI °C. | $T_g$, PS °C. |
|---|---|---|---|---|---|
| XVII | 2.70 | 10.0 | 125 | −67 | 100 |
| XVIII | 2.64 | 20.0 | 113 | −75 | 95 |

What is claimed is:

1. In the process of anionically polymerizing ethylenically unsaturated compound monomer in the presence of an organoalkali metal compound initiator during passage through a reaction zone of a co-rotating, self-wiping, twin-screw extruder, the improvement of employing a reaction temperature from about 200° C. to about 300° C. and a residence time in the reaction zone of the extruder of less than about 5 minutes.

2. The process of claim 1 wherein the residence time is less than about 30 seconds.

3. In the process of anionically polymerizing vinylaromatic hydrocarbon compound in the presence of an organolithium initiator during passage through a reaction zone of a co-rotating, self-wiping, twin-screw extruder, the improvement of empolying a reaction temperature from about 200° C. to about 300° C. and a residence time in the reaction zone of the extruder of less than about 5 minutes.

4. The process of claim 3 wherein the residence time is less than about 30 seconds.

5. In the process of anionically polymerizing styrene in the presence of a sec-butyllithium initiator during passage through a reaction zone of a co-rotating, self-wiping, twin-screw extruder, the improvement of empolying a reaction temperature of from about 200° C. to about 300° C. and a residence time in the reaction zone of the extruder of less than about 2 minutes.

6. In the process of producing copolymers of vinylaromatic hydrocarbon compound and 1,3-alkadiene in the presence of an organolithium initiator during passage through a reaction zone of a co-rotating, self-wiping, twin-screw extruder, the improvement of empolying a reaction temperature of from about 200° C. to about 300° C. and a residence time in the reaction zone of the extruder of less than about 5 minutes.

7. The process of claim 6 wherein the residence time is less than about 30 seconds.

8. In the process of producing copolymers of styrene and butadiene or isoprene in the presence of a sec-butyllithium initiator during passage through a reaction zone of a co-rotating, self-wiping, twin-screw extruder, the improvement of empolying a reaction temperature of from about 200° C. to about 300° C. and a residence time in the reaction zone of the extruder of less than about 2 minutes.

* * * * *